Aug. 24, 1926.
R. P. BOWER
1,597,009
MOVABLE HEADLIGHT
Filed Sept. 3, 1924    2 Sheets-Sheet 1
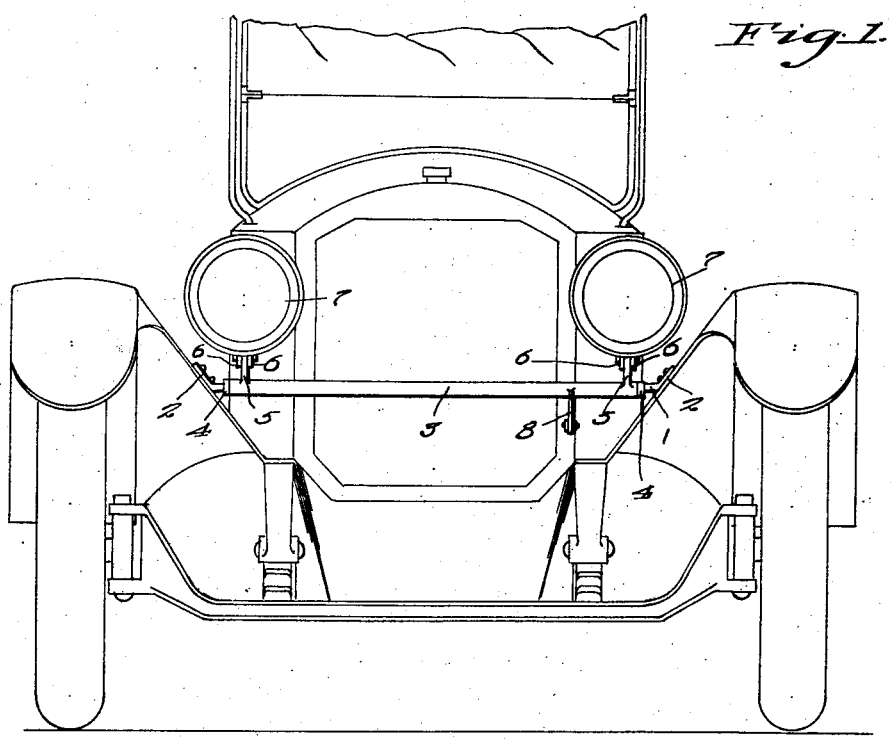
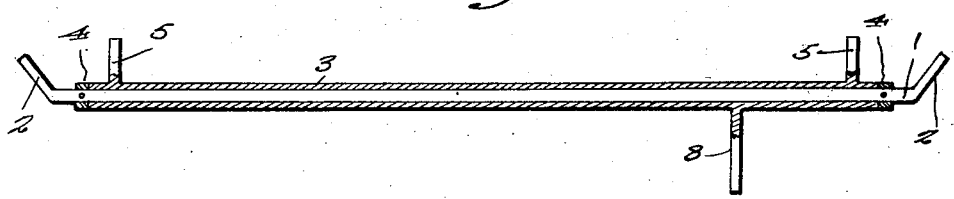
R. P. Bower  INVENTOR
BY Victor J. Evans
ATTORNEY
WITNESS:

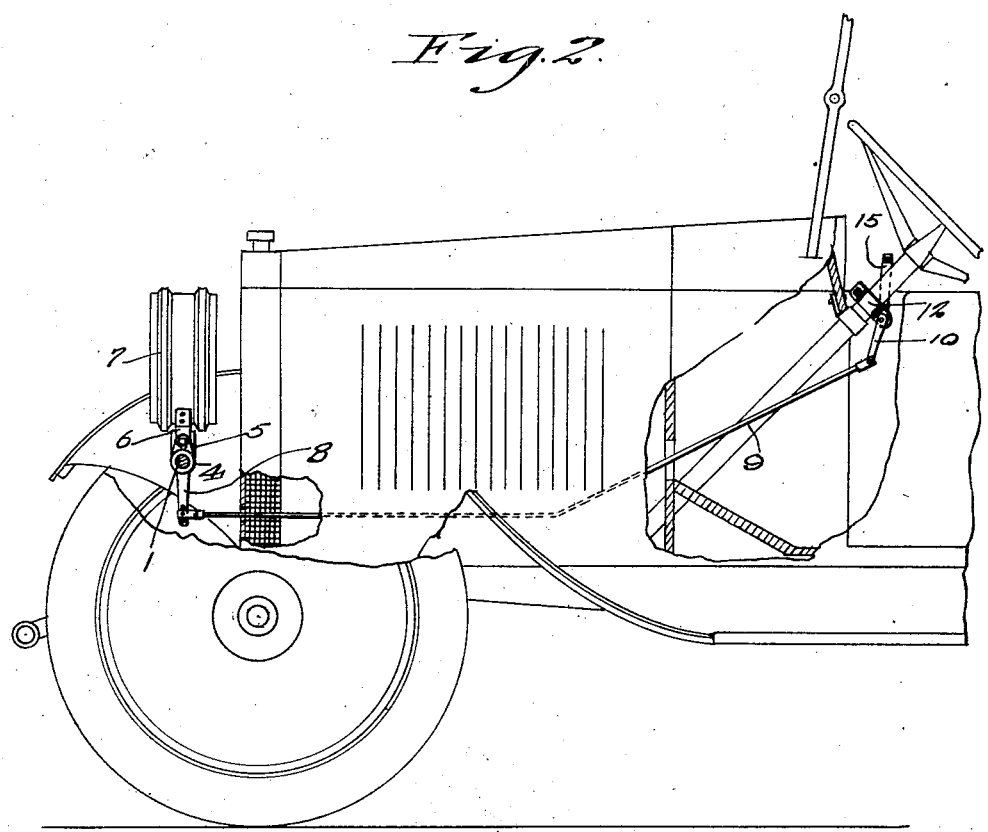
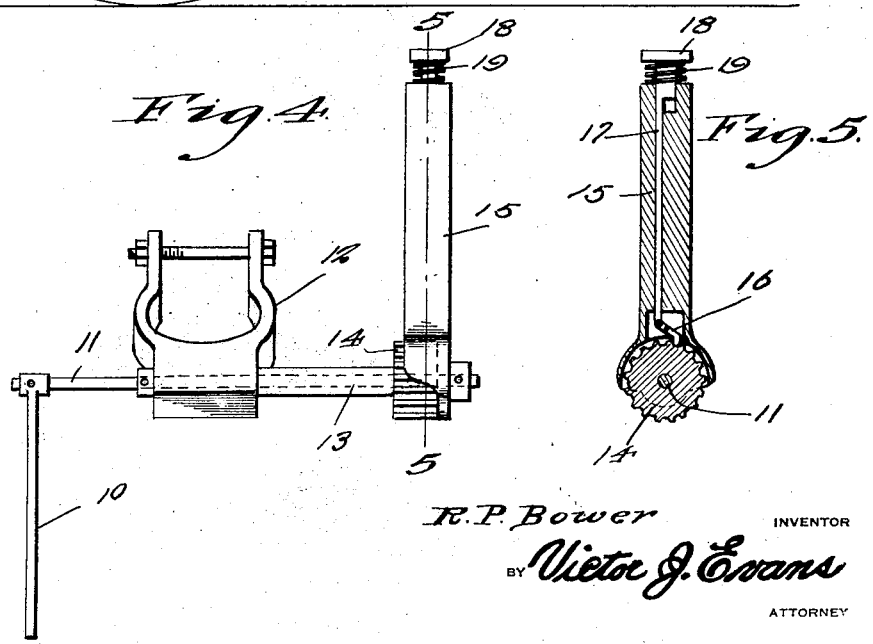

Patented Aug. 24, 1926.

1,597,009

UNITED STATES PATENT OFFICE.

ROY P. BOWER, OF PORTSMOUTH, OHIO.

MOVABLE HEADLIGHT.

Application filed September 3, 1924. Serial No. 735,658.

This invention relates to improvements in headlamps for motor vehicles, the general object of the invention being to provide means for tilting the lamps so that the light rays can be deflected downwardly to prevent blinding of the drivers of approaching cars while illuminating the road ahead of the vehicle to which the improved lamps are attached.

Another object of the invention is to make the device so that it can be manufactured to sell at low cost and so that it can be installed on existing models of vehicles.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:

Figure 1 is a front view of an automobile showing my invention in use.

Figure 2 is a side view of Figure 1 with parts in section.

Figure 3 is a sectional view showing the manner of mounting the lamp supporting tube.

Figure 4 is a view of the operating means.

Figure 5 is a section on line 5—5 of Figure 4.

In these views 1 indicates a rod which is provided with flattened inclined extremities 2 which are adapted to be fastened to the front fender aprons of the vehicle, as shown in Figure 1, so that the rod will extend across the front of the vehicle. A tube 3 is rotatably mounted on the rod and is held in place by the collars 4 which are fastened to the rod and engage the ends of the tube. The tube is provided with a pair of upwardly extending ears 5 to which the ears 6 on the lamps 7 are fastened. The tube is also provided with a depending arm 8 to which is pivoted the front end of a rod 9 which passes through the front of the vehicle and through the dash thereof and has its other end pivoted to an arm 10 on a shaft 11 which is supported by a clamp 12 which is adapted to be fastened to the steering post of the vehicle. This clamp is provided with a long bearing sleeve 13 through which the shaft 11 passes and the outer end of this sleeve has connected therewith a ratchet disk 14. A handle 15 is fastened to the shaft 11 and has its lower end partly encircling the disk 14. A dog 16 is pivoted to the handle and engages the ratchet disk to hold the handle in adjusted position. This dog is manipulated through means of a rod or plunger 17 passing through the handle and pivoted to the dog and having a button 18 at its upper end which is engaged by a spring 19 which acts to hold the parts with the dog in engagement with the ratchet disk.

From the foregoing it will be seen that when the driver wishes to tilt the lamps downwardly to prevent the rays of light therefrom from blinding pedestrians or drivers of other cars he will simply grasp the handle and push downwardly upon the button 18 to release the dog 16 and then move the handle to rock the shaft 11. This rocking movement is communicated to the lamps through the rod 9, arm 8 and the tube 3. By releasing the button 18 the spring will cause the dog to again engage the ratchet disk and thus the handle will be held in its adjusted position. Then when the driver wishes to restore the lamps to their original and running position he will simply grasp the handle again, depress the button 18 and move the handle to its first position. Then the light rays from the lamps will be directed well ahead of the vehicle to give full illumination of the road. In this way the driver can prevent his headlights from blinding pedestrians and other drivers without dimming the headlights so that he will have proper illumination of the road at all times without danger of blinding other persons.

It is thought from the foregoing description that the advantages and novel features of my invention will be readily apparent.

I desire it to be understood that I may make changes in the construction and in the combination and arrangement of the several parts, provided that such changes fall within the scope of the appended claim.

Having described the invention, I claim:—

Movable head lights for a motor vehicle including a supporting rod extending transversely of the front of the vehicle, a tube rotatably mounted upon the rod, upwardly projecting ears at each end of the tube forming supporting brackets, a downwardly depending arm on said tube adjacent one end, means forming connection with said arm whereby to impart a pivotal movement to said headlights upon movement of the arm due to the rotated movement of the said tube, said latter means including a rod having one end attached to the arm, a clamp on the steering post of the vehicle a shaft carried thereby, an arm on one end of the shaft pivoted to the rod which is connected to the depending arm, a handle connected with the other end of the shaft, ratchet mechanism for holding the handle in adjusted positions and a spring plunger in the handle and connected with the ratchet mechanism.

In testimony whereof I affix my signature.

ROY P. BOWER.